United States Patent
Strom et al.

(10) Patent No.: US 9,562,616 B2
(45) Date of Patent: Feb. 7, 2017

(54) SPRING ASSEMBLIES FOR USE IN GAS TURBINE ENGINES AND METHODS FOR THEIR MANUFACTURE

(71) Applicant: HONEYWELL INTERNATIONAL INC., Morristown, NJ (US)

(72) Inventors: Laurie Strom, Scottsdale, AZ (US); Donald G. Godfrey, Phoneix, AZ (US); Harry Lester Kington, Scottsdale, AZ (US); Douglas Hall, Niles, MI (US); Mark C. Morris, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 954 days.

(21) Appl. No.: 13/742,210

(22) Filed: Jan. 15, 2013

(65) Prior Publication Data

US 2014/0283922 A1    Sep. 25, 2014

(51) Int. Cl.
*B21F 35/00* (2006.01)
*F16K 17/04* (2006.01)
*B22F 3/105* (2006.01)
*F16F 1/04* (2006.01)
*B22F 5/00* (2006.01)

(52) U.S. Cl.
CPC .......... *F16K 17/048* (2013.01); *B22F 3/1055* (2013.01); *F16F 1/043* (2013.01); *F16F 1/047* (2013.01); *B22F 5/009* (2013.01); *Y02P 10/295* (2015.11); *Y10T 29/49412* (2015.01); *Y10T 137/2705* (2015.04)

(58) Field of Classification Search
CPC ............. F16F 1/021; F16F 1/043; F16F 1/047
USPC .................. 251/337; 267/170, 174, 179, 180
See application file for complete search history.

(56) References Cited

U.S. PATENT DOCUMENTS

| | | | | |
|---|---|---|---|---|
| 231,150 | A * | 8/1880 | Cliff | 267/286 |
| 5,246,215 | A * | 9/1993 | Takamura et al. | 267/170 |
| 5,687,958 | A | 11/1997 | Renz et al. | |
| 5,992,584 | A | 11/1999 | Moody | |
| 6,193,225 | B1 * | 2/2001 | Watanabe | 267/180 |
| 6,273,396 | B1 * | 8/2001 | Kato | 251/129.21 |
| 6,517,060 | B1 | 2/2003 | Kemeny | |

(Continued)

OTHER PUBLICATIONS

"Integral". Merriam-Webster. Jun. 2015.*

(Continued)

*Primary Examiner* — R. K. Arundale
(74) *Attorney, Agent, or Firm* — Ingrassia Fisher & Lorenz, P.C.

(57) ABSTRACT

In accordance with an exemplary embodiment, a method for manufacturing a bypass valve of a turbine engine control system is described. The bypass valve includes a proportional valve and an integrator valve and the integrator valve includes an integrator spring assembly. The method includes forming the integrator spring assembly using an additive manufacturing technique. The integrator spring assembly comprises first and second end portions with a spring portion disposed between the first and second end portions. The first and second end portions and the spring portion are formed as an integral unit without welding or brazing using the additive manufacturing technique. The method further includes assembling the integrator spring assembly, the integrator valve, and the proportional valve into a complete bypass valve assembly.

17 Claims, 4 Drawing Sheets

(56) References Cited

U.S. PATENT DOCUMENTS

| | | |
|---|---|---|
| 6,634,472 B1 | 10/2003 | Davis et al. |
| 7,648,589 B2 | 1/2010 | Taya et al. |
| 7,757,400 B2 | 7/2010 | Widmer et al. |
| 7,931,643 B2 | 4/2011 | Olsen et al. |
| 8,985,234 B2 * | 3/2015 | Gadzella et al. ............ 172/264 |
| 2005/0023075 A1 | 2/2005 | Schmaeman |
| 2005/0217954 A1 | 10/2005 | Hindle et al. |
| 2007/0132465 A1 | 6/2007 | Kreissig et al. |
| 2008/0231046 A1 | 9/2008 | Osaka et al. |
| 2009/0131118 A1 | 5/2009 | Kim |
| 2009/0250852 A1 | 10/2009 | Jones et al. |
| 2009/0306717 A1 | 12/2009 | Kercher et al. |
| 2010/0320358 A1 | 12/2010 | Boyd et al. |
| 2011/0190904 A1 | 8/2011 | Lechmann et al. |
| 2011/0306949 A1 | 12/2011 | Specht et al. |
| 2012/0007286 A1 | 1/2012 | Shi |
| 2012/0247788 A1 | 10/2012 | Ford et al. |
| 2012/0267506 A1 | 10/2012 | Hadden et al. |
| 2013/0195665 A1 | 8/2013 | Snyder et al. |

OTHER PUBLICATIONS

USPTO Office Action for U.S. Appl. No. 13/540,409 dated Mar. 26, 2015.

Obielodan, J.O.; Fabrication of Multi-Material Structures Using Ultrasonic Consolidation and Laser-Engineered Net Shaping; Utah State University DigitalCommons@USU, Dec. 1, 2010.

Espalin, D. et al.; Multi-Material, Multi-Technology FDM System; W.M. Keck Center for 3D Innovation, Department of Mechanical Engineering, The University of Texas at El Paso, Aug. 15, 2012.

USPTO Final Office Action for U.S. Appl. No. 13/540,409 dated Oct. 8, 2015.

USPTO Final Office Action for U.S. Appl. No. 13/540,409 dated Mar. 1, 2016.

* cited by examiner

SPRING ASSEMBLIES FOR USE IN GAS TURBINE ENGINES AND METHODS FOR THEIR MANUFACTURE

TECHNICAL FIELD

An embodiment of the present disclosure generally relates to spring assemblies, and more particularly relates to spring assemblies for use in gas turbine engines.

BACKGROUND

A gas turbine engine may be used to power aircraft or various other types of vehicles and systems. The engine typically includes a compressor that receives and compresses an incoming gas such as air; a combustion chamber in which the compressed gas is mixed with fuel and burned to produce exhaust gas; and one or more turbines that extract energy from the high-pressure, high-velocity exhaust gas exiting the combustion chamber.

Figure 1:
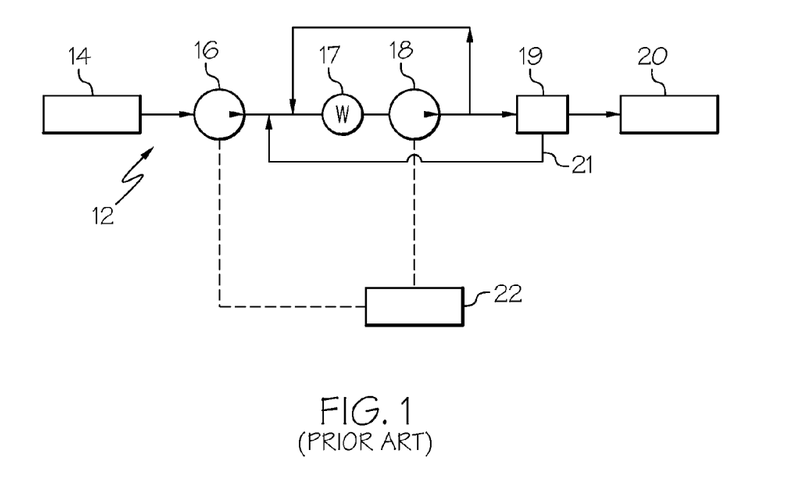
FIG. 1 is a schematic diagram of an engine control system including a hydro-mechanical unit (HMU)

A gas turbine engine typically further includes an engine control system, which as used herein refers to a system that serves in particular to control the operating speed of the turbine engine. By way of example, the engine control system controls the flow rate of air passing through the turbine engine, the flow rate of fuel into the combustion chamber, etc. A known example of an engine control system is shown in FIG. 1. The engine control system is fitted to a turbine engine having a main fuel circuit 12 including: a low pressure pump 16 connected to a fuel tank 14; a heat exchanger 17; a high pressure pump 18; and a hydro-mechanical unit (HMU) 19. The low pressure and high pressure pumps 16 and 18 are mechanically driven by an accessory gearbox 22 of the turbine engine. The high pressure pump 18 feeds the fuel injectors of the combustion chamber 20 of the turbine engine via the HMU 19. This HMU 19 serves in particular to measure out the fuel needed by the combustion chamber 20, and to return excess fuel to the main circuit 12 upstream from the heat exchanger 17 via a recirculation loop 21.

Figure 2:
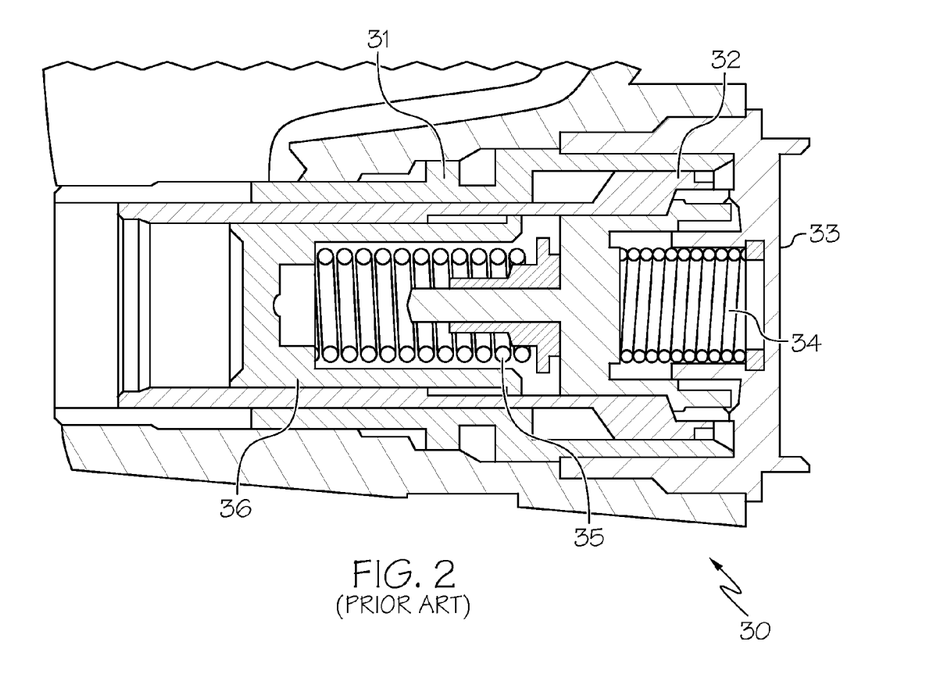
FIG. 2 is a cross-sectional view of a bypass valve as may be employed in the HMU of FIG. 1.

As part of the assembly provided to allow the HMU 19 to measure fuel, the HMU 19 includes a bypass valve 30, shown in cross-section in FIG. 2. Briefly, an exemplary bypass valve 30 includes an integrator valve 32 and a proportional valve 36. The integrator valve 32 includes an integrator spring assembly 34, and the proportional valve 36 includes a proportional spring 35. The bypass valve further includes a cover 33 surrounding the integrator spring assembly 34, and a sleeve 31 surrounding the proportional spring 35. The integrator spring assembly 34 anti-rotates the integrator valve 32 so as to prevent the introduction of wear debris in the assembly, and to further prevent fractures of the spring assembly 34.

Despite the anti-rotated design of the integrator valve 32, it is hypothesized that, in some rare instances, twisting of the integrator spring assembly 34 in the integrator valve 32 may result in pre-mature wear and/or fracturing of the spring assembly 34. Wear and/or fracturing of the spring assembly 34 could result in degraded performance and/or malfunctioning of the bypass valve 30. Accordingly, it is desirable to provide an improved bypass valve assembly, and in particular an improved integrator spring assembly, that further reduces the likelihood of pre-mature wear and/or fracturing of the integrator spring assembly. It is further desirable to provide methods for the production of such assemblies. Furthermore, other desirable features and characteristics of the invention will become apparent from the subsequent detailed description and the appended claims, taken in conjunction with the accompanying drawings and this background of the invention.

BRIEF SUMMARY

In accordance with an exemplary embodiment, a method for manufacturing a bypass valve of a turbine engine control system is described. The bypass valve includes a proportional valve and an integrator valve and the integrator valve includes an integrator spring assembly. The method includes forming the integrator spring assembly using an additive manufacturing technique. The integrator spring assembly comprises first and second end portions with a spring portion disposed between the first and second end portions. The first and second end portions and the spring portion are formed as an integral unit without welding or brazing using the additive manufacturing technique. The method further includes assembling the integrator spring assembly, the integrator valve, and the proportional valve into a complete bypass valve assembly.

In accordance with another exemplary embodiment, a spring assembly includes a first end portion, a second end portion, and a spring portion disposed between the first end portion and the second end portion. The spring portion includes one or more of a variable pitch and a variable cross-sectional area. The spring assembly is manufactured as an integral unit without any welding or brazing of the first end portion, the second end portion, or the spring portion.

In accordance with yet another embodiment, a bypass valve assembly for use in an engine control system of a gas turbine engine includes a proportional valve assembly including a proportional spring and an integrator valve assembly including an integrator spring assembly. The integrator spring assembly includes a first end portion, a second end portion, and a spring portion disposed between the first end portion and the second end portion. The spring portion includes one or more of a variable pitch and a variable cross-sectional area. The integrator spring assembly is manufactured as an integral unit without any welding or brazing of the first end portion, the second end portion, or the spring portion.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. Furthermore, as used herein, numerical ordinals such as "first," "second," "third," etc., such as first, second, and third components, simply denote different singles of a plurality unless specifically defined by language in the appended claims. All of the embodiments and implementations of the spring assemblies and methods for the manufacture thereof described herein are exemplary embodiments provided to enable persons skilled in the art to make or use the invention and not to limit the scope of the invention, which is defined by the claims. Furthermore, there is no intention to be bound by any expressed or implied theory presented in the preceding technical field, background, brief summary, or the following detailed description.

Further, although certain embodiments described herein provide improved spring assemblies for use in bypass valve assemblies, and in particular integrator valve assemblies thereof, it will be appreciated that the spring assemblies described herein will be useful in any number of applications wherein spring assemblies are employed. In particular, the spring assemblies described herein may find application in any of various implementations where premature wear and/or fracturing due to twisting of the spring assembly may be encountered.

Disclosed herein is an enhanced spring assembly that is fabricated using a free-form manufacturing process for its production. Unlike known spring assemblies, embodiments of the present disclosure utilize a manufacturing process that incorporates a low energy density laser beam, referred to as "direct metal laser fusion" (DMLF), or a low energy electron beam, referred to as "electron beam melting" (EBM), in a powder tank. These "free-form" or "additive manufacturing" (AM) processes use a small, focused beam to build a component by fusing or melting one layer of powder to the fused or melted layer of powder directly beneath it. The additive manufacturing methods disclosed herein utilize DMLF/EBM to build unique designs that are not practical and/or possible with prior technologies such as spring coiling machines, where costly and time-consuming tooling is required.

Figure 3:
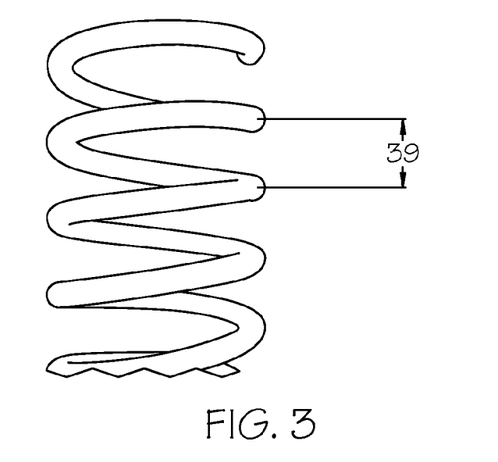
FIG. 3 illustrates the "pitch" of a spring as may be employed in the bypass valve of FIG. 2.

For purposes of illustrating the various benefits of the improved spring assemblies and methods of their manufacture disclosed herein, prior art methods of spring manufacturing will be briefly described. With prior art methods, the shape, diameter and pitch of a spring is produced via tooling. Some prior art methods utilize a wire to make a spring, which is coiled around rollers and dies and then (if necessary) grinding the ends of the spring. Other prior art methods, useful for low volume production, include spring fabrication via the "lathe" spring concept: Prior to being coiled over a mandrel or other type of spring tooling, the wire is drawn through a mandrel to produce a unique geometry. This geometry is constant across the entire length of the spring. Using these prior art methods, springs are produced with a given pitch, cross-sectional area, and wire diameter. These springs are constant in their tension, torsion control, compression strength, and tension capabilities. All of these features are a function of a spring's material, cross-section, wire diameter, length, number of coils per inch (pitch; FIG. 3 illustrates the pitch 39 of a prior art spring coil, which is constant along the length of the spring), and end design. When machines and tooling are used, such as those known in the prior art, the shape of the spring is forced into repeatability, and the pitch and diameter of the spring are equal on both ends of the spring. In addition large coil springs with large cross-sectional coil areas may not be possible due to die limitations.

Embodiments of the present disclosure enable the manufacturing of springs with the use of dissimilar materials as well as unique geometries to be produced in a cost-effective way and with reduced lead time. The embodiments utilize additive manufacturing methods such as DMLS and EBM to build a flexible spring onto a component of a different material system. Alternatively, a new DMLS or EBM material system may be built onto an existing DMLS or EBM spring or spring assembly. For example, producing DMLS or EBM springs with geometric platforms or anti-rotation features on the ends of the springs prevents the spring from twisting, which is expected to reduce the likelihood of premature wear and/or fracturing.

An embodiment of the present disclosure enables additive manufacturing technology to be used in the production and application of unique alloy systems, including nickel based alloys, cobalt based alloys, steel alloys, titanium alloys, and aluminum alloys, used in distressing environments. One benefit is that distressed areas of a spring can be minimized due to selecting the appropriate material for each area of the spring and or application. Casting technology is not economically capable of this multi-material manufacturing approach. Currently, the only way to produce springs with dissimilar materials is via welding, brazing, or bi-casting components together to construct an assembly.

An embodiment of the present disclosure allows for individual spring fabrication with multiple geometries and various pitches and cross-sectional areas, as the technology does not use cams, dies or other types of design-limiting tooling. Spring cross-sectional areas from about 0.020 inches to about 2.00 inches can easily be produced. This technology can be used to produce springs that have one compression stiffness at one end of the spring and a different stiffness at the other end of the spring. In addition, the ends of the spring can be produced to be unique in geometry and thus eliminate the spring end grinding process used in the prior art. The shape of the wire is not determined by drawing the material through a die, and a spring may now have an optimized cross-sectional distribution as needed. Another feature of the present disclosure is the enabling of multi-material and varying cross-sectional area springs to produce linear and non-linear spring rates.

Figure 4:
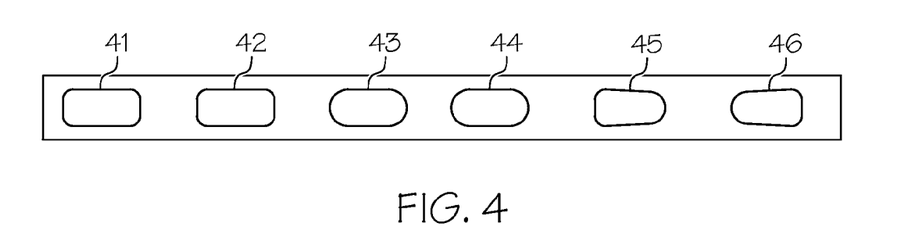
FIG. 4 illustrates exemplary cross-sectional geometries of a spring as may be employed in the bypass valve of FIG. 2.

Reference is now made to FIG. 4, which illustrates a plurality of exemplary spring cross-sectional areas 41-46. A spring assembly in accordance with an embodiment of the present disclosure may utilize one, two, three, or more of cross-sections 41-46 (or any other cross section as is known in the art) along its length. For example, a spring in accordance with the present disclosure may have a length, with the length including a first length section and a second length section. The first length section may have a cross-section of one of exemplary cross sectional areas 41-46. The second length section may have a cross-section of one other of the exemplary cross sectional areas 41-46. A small transition zone disposed between the first and second length sections may be employed to allow for a smooth transition between the different cross-sections of the first length section and the second length section. As noted above, DMLS and EBM manufacturing techniques allow an integral structure to be formed of multiple cross-sections without the need for brazing/welding different sections together. Varying cross sectional areas are possible to produce a wide range of desired force-deflection characteristics of the spring assemblies.

Figure 5:
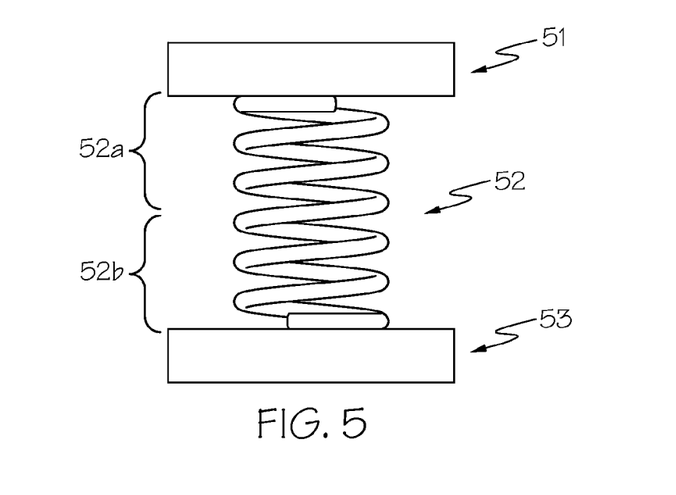
FIG. 5 illustrates an exemplary multi-material spring assembly as may be employed in the bypass valve of FIG. 2.

Reference is now made to FIG. 5, which illustrates a side view of an exemplary spring assembly including a spring section 52 and two end sections 51, 53. A spring assembly in accordance with an embodiment of the present disclosure may utilize one, two, three, or more different materials for the spring section 52, the end section 51, and the end section 53. Additionally, each such section 51-53 may itself include one, two, three, or more different materials. For example, spring section 52 may include a first portion 52*a* comprised of a first alloy material and a second portion 52*b* comprised of a second alloy material different from the first alloy material. In another example, in FIG. 5, the spring section 52 may be made of a nickel based or steel alloy material, and the end sections 51 and 53 may be made of a cobalt based alloy material. As noted above, DMLS and EBM manufacturing techniques allow an integral structure to be formed of multiple materials without the need for brazing/welding different material sections together. Different materials are employed if desired to produce the desired force-deflection characteristic of the spring assembly, without geometric stress concentrations that reduce the fatigue life of such spring assemblies.

In another embodiment, a spring assembly in accordance with an embodiment of the present disclosure may utilize one, two, three, or more different pitches for the spring section 52 (refer to FIG. 3 for an exemplary pitch 39 of a spring section). For example, a spring in accordance with the present disclosure may have a length, with the length including a first length section and a second length section. The first length section may have a first pitch. The second length section may have a second pitch that is smaller or larger than the first pitch. Different pitches are employed if desired to produce the desired force-deflection characteristic of the spring assembly, without geometric stress concentrations that reduce the fatigue life of such spring assemblies.

In general, it is expected that, based on the teachings herein, a person having ordinary skill in the art will be able to modify the spring assemblies as above to conform for use in a wide variety of applications, as the selection of size, shape, etc. of working components is generally considered to be within the level of skill of a person having ordinary skill in the art. As such, the various possible implementations of the spring assemblies should not be considered limited to any of the embodiments presented herein.

Embodiments of the present disclosure allow for springs with improved performance and extended life. The embodiments utilize a low energy density laser beam with DMLS or EBM by submerging the component in a fixture in a powder tank. This technology is well suited for multi-material production since, unlike the prior art, this technology has the flexibility to produce multi-material multi-cross section, and multi-pitch components, as shown above in FIGS. 4 and 5.

Greater detail regarding the additive manufacturing techniques noted above will now be provided, again with reference to the exemplary spring assemblies illustrated in FIGS. 4 and 5. It will be appreciated that certain features of the presently described spring assemblies would be prohibitively expensive to manufacture using conventional manufacturing techniques. These include the integral spring assemblies (no brazing or welding joints), the optimally configured cross-sectional areas, and the optimally configured material constituents, among others. As such, designs in accordance with the present disclosure are not known in the prior art. However, it has been discovered that using additive manufacturing techniques, or other recently developed manufacturing techniques, designs in accordance with the present disclosure can be manufactured at a significantly reduced cost as compared to traditional manufacturing techniques. Additive manufacturing techniques include, for example, direct metal laser sintering (DMLS—a form of direct metal laser fusion (DMLF)) with nickel base super-alloys, cobalt based alloys, steel alloys, low density titanium, and aluminum alloys. DMLS is discussed in greater detail below. Another technique includes electron beam melting (EBM) with titanium, titanium aluminide, and nickel base super-alloy materials.

Figure 6:
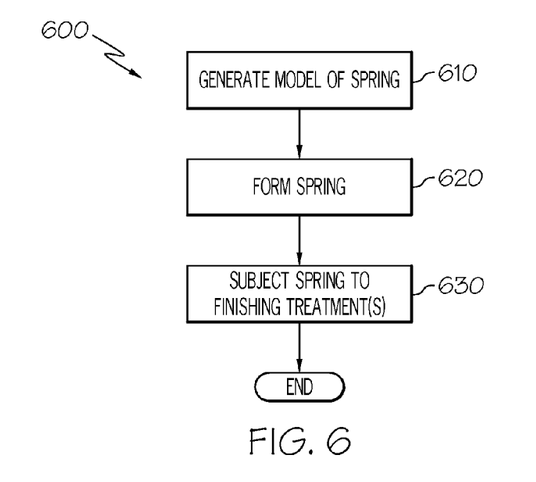
FIG. 6 is a flow diagram illustrating steps in a method of manufacturing a spring assembly in accordance with an embodiment of the present disclosure.

FIG. 6 is a flowchart illustrating a method 600 for manufacturing a spring assembly in accordance with an exemplary embodiment using, in whole or in part, additive manufacturing techniques. In the discussion that follows, "the spring assembly" will be referred to generically as representative of any or all portions of a spring in accordance with the present disclosure, including but not limited to the configurations shown in FIGS. 4-5, for example, that can be made using additive manufacturing techniques.

In a first step 610, a model, such as a design model, of the spring assembly, or component thereof, may be defined in any suitable manner. For example, the model may be designed with computer aided design (CAD) software and may include three-dimensional ("3D") numeric coordinates of the entire configuration of the spring assembly including both external and internal surfaces. In one exemplary embodiment, the model may include a number of successive two-dimensional ("2D") cross-sectional slices that together form the 3D component.

This design phase step 610 is performed in the following manner. During the design phase, 3D structural analyses are employed to generate an optimal design for a particular implementation, for example the cross-sectional area(s) and the material(s) used in the manufacture of the spring assembly for optimal operation and life. The configuration is then analyzed with 3D stress/deflection analyses to optimize the mechanical fatigue life of the assembly. The resulting configuration is enabled without the prior art requirements of brazing/welding. The assembly is fabricated as a single, integral unit.

In step 620 of the method 600, the spring assembly, or component thereof, is formed according to the model of step 610. In one exemplary embodiment, a portion of the spring assembly is formed using a rapid prototyping or additive layer manufacturing process. In other embodiments, the entire spring assembly is formed using a rapid prototyping or additive layer manufacturing process. Although additive layer manufacturing processes are described in greater detail below, in still other alternative embodiments, portions of the spring assembly may be forged or cast in step 620.

Some examples of additive layer manufacturing processes include: micro-pen deposition in which liquid media is dispensed with precision at the pen tip and then cured; selective laser sintering in which a laser is used to sinter a powder media in precisely controlled locations; laser wire deposition in which a wire feedstock is melted by a laser and then deposited and solidified in precise locations to build the product; electron beam melting; laser engineered net shaping; and direct metal deposition. In general, additive manufacturing techniques provide flexibility in free-form fabrication without geometric constraints, fast material processing time, and innovative joining techniques. In one particular exemplary embodiment, direct metal laser fusion (DMLF) is used to produce the spring assembly in step 620. DMLF is a commercially available laser-based rapid prototyping and tooling process by which complex parts may be directly produced by precision melting and solidification of metal powder into successive layers of larger structures, each layer corresponding to a cross-sectional layer of the 3D component. DMLF may include direct metal laser sintering (DMLS), as previously noted above, and is a particularly preferred embodiment of this disclosure.

As such, in one exemplary embodiment, step 620 is performed with DMLF techniques to form the spring assembly. However, prior to a discussion of the subsequent method steps, reference is made to FIG. 7, which is a schematic view of a DMLF system 700 for manufacturing the spring assembly, for example one or more components of the spring assembly as shown in FIGS. 4-5, in accordance with an exemplary embodiment.

Figure 7:
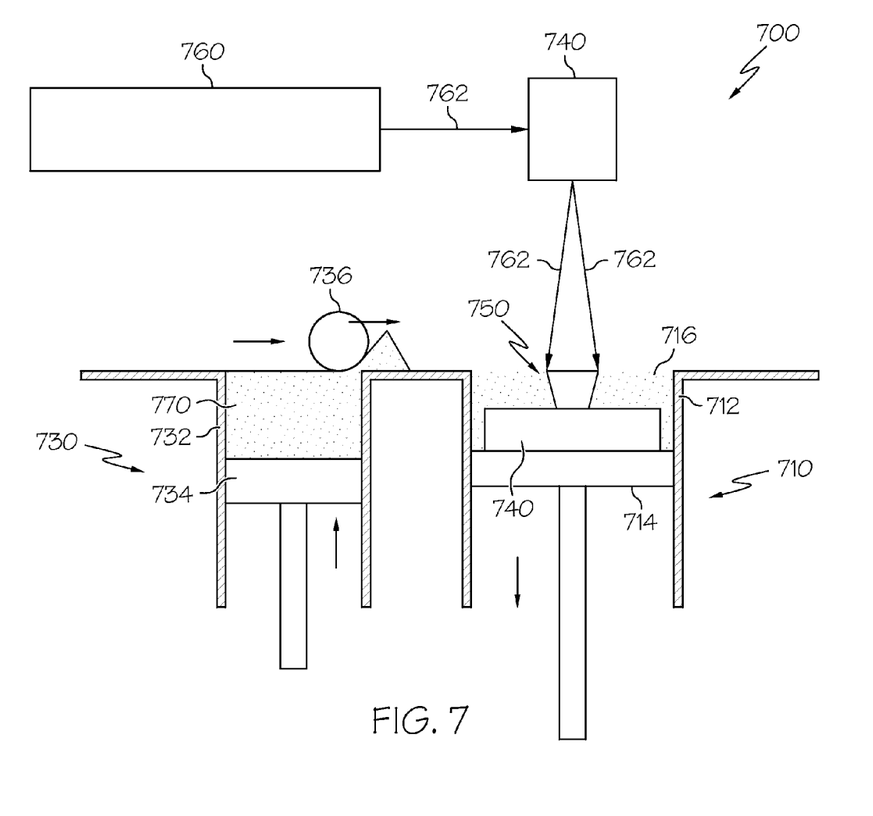
FIG. 7 is an exemplary additive manufacturing system suitable for use in manufacturing spring assemblies in accordance with an embodiment of the present disclosure.

Referring to FIG. 7, the system 700 includes a fabrication device 710, a powder delivery device 730, a scanner 740, and a laser 760 that function to manufacture the article 750 (e.g., the spring assembly, or a component thereof) with build material 770. The fabrication device 710 includes a build container 712 with a fabrication support 714 on which the article 750 is formed and supported. The fabrication support 714 is movable within the build container 712 in a vertical direction and is adjusted in such a way to define a working plane 716. The delivery device 730 includes a powder chamber 732 with a delivery support 734 that supports the build material 770 and is also movable in the vertical direction. The delivery device 730 further includes a roller or wiper 736 that transfers build material 770 from the delivery device 730 to the fabrication device 710.

During operation, a base block 740 may be installed on the fabrication support 714. The fabrication support 714 is lowered and the delivery support 734 is raised. The roller or wiper 736 scrapes or otherwise pushes a portion of the build material 770 from the delivery device 730 to form the working plane 716 in the fabrication device 710. The laser 760 emits a laser beam 762, which is directed by the scanner 740 onto the build material 770 in the working plane 716 to selectively fuse the build material 770 into a cross-sectional layer of the article 750 according to the design. More specifically, the speed, position, and other operating parameters of the laser beam 762 are controlled to selectively fuse the powder of the build material 770 into larger structures by rapidly melting the powder particles that may melt or diffuse into the solid structure below, and subsequently, cool and re-solidify. As such, based on the control of the laser beam 762, each layer of build material 770 may include unfused and fused build material 770 that respectively corresponds to the cross-sectional passages and walls that form the article 750. In general, the laser beam 762 is relatively low power to selectively fuse the individual layer of build material 770.

As an example, the laser beam 762 may have a power of approximately 50 to 500 Watts, although any suitable power may be provided.

Upon completion of a respective layer, the fabrication support 714 is lowered and the delivery support 734 is raised. Typically, the fabrication support 714, and thus the article 750, does not move in a horizontal plane during this step. The roller or wiper 736 again pushes a portion of the build material 770 from the delivery device 730 to form an additional layer of build material 770 on the working plane 716 of the fabrication device 710. The laser beam 762 is movably supported relative to the article 750 and is again controlled to selectively form another cross-sectional layer. As such, the article 750 is positioned in a bed of build material 770 as the successive layers are formed such that the unfused and fused material supports subsequent layers. This process is continued according to the modeled design as successive cross-sectional layers are formed into the completed desired portion, e.g., the spring assembly, or component thereof, of step 620.

The delivery of build material 770 and movement of the article 750 in the vertical direction are relatively constant and only the movement of the laser beam 762 is selectively controlled to provide a simpler and more precise implementation. The localized fusing of the build material 770 enables more precise placement of fused material to reduce or eliminate the occurrence of over-deposition of material and excessive energy or heat, which may otherwise result in cracking or distortion. The unused and unfused build material 770 may be reused, thereby further reducing scrap.

Any suitable laser and laser parameters may be used, including considerations with respect to power, laser beam spot size, and scanning velocity. As a general matter, the build material 770 may be formed by any suitable powder, including powdered metals, such as a stainless steel powder, and alloys and super alloy materials, such as nickel-based or cobalt superalloys. In one exemplary embodiment, the build material 770 is a high temperature nickel base super alloy such as IN718. In other embodiments, MAR-M-247, IN738, cobalt alloys, titanium, aluminum, titanium-aluminide, steel alloys, or other suitable alloys may be employed. In general, the powder build material 770 may be selected for enhanced strength, durability, and useful life, particularly at high temperatures, although as described below, the powder build material 770 may also be selected based on the intended function of the area being formed.

Returning to FIG. 6, at the completion of step 620, the article, i.e., the spring assembly, is removed from the additive manufacturing system (e.g., from the DMLF system 700). In optional step 630, the spring assembly formed in step 620 may undergo finishing treatments. Finishing treatments may include, for example, aging, annealing, quenching, peening, polishing, hot isostatic pressing (HIP), or coatings. If necessary, the spring assembly may be machined to final specifications. As noted above, one example of a post-laser fusion process of step 630 is a HIP process in which an encapsulation layer is applied and pressure and heat are applied to remove or reduce any porosity and cracks internal to or on the surface of the component, as described in U.S. patent application Ser. No. 12/820,652, titled "METHODS FOR MANUFACTURING TURBINE COMPONENTS," and published as United States Patent Application Publication No. 2011/0311389. The encapsulation layer functions to effectively convert any surface porosity and cracks into internal porosity and cracks, and after the application of pressure and heat, removes or reduces the porosity and cracks. Such encapsulation layers may be subsequently removed or maintained to function as an oxidation protection layer.

In one exemplary embodiment, the encapsulation layer may be a metal or alloy that is compatible with the substrate and may be applied by a plating or coating process, as described below. In one embodiment, the HIP process may be performed at a processing temperature in a range of about 1000° C. to about 1300° C. and may be performed at a pressure in a range of about 1 ksi to about 25 ksi for a time period of about 1 to about 10 hours. In other embodiments, the HIP processing temperature, pressure, and time may be smaller or larger to form a compacted solid having negligible porosity.

The method 600 has been discussed above with reference to the formation of a single spring assembly, or component thereof. However, in one exemplary embodiment of the method 600, more than one spring assembly (or component thereof) may be manufactured simultaneously. Unless otherwise noted, method 600 in this embodiment proceeds as discussed above. In this embodiment of the method 600, the articles are formed on a common base block (e.g., base block 740) to provide a common orientation and a known point of reference and formed as discussed above. Successive layers can be formed for the group of articles simultaneously according to a common module or design. For example, the powdered metal may be deposited across a single working plane and one or more lasers may selectively fuse the layers of each intermediate turbine article, either sequentially or simultaneously. The articles may then be lowered together for the formation of the next layer. Simultaneous fabrication of a number of components may reduce cost and variability of the manufacturing process.

Accordingly, exemplary embodiments may enhance spring assemblies fabricated with additive manufacturing techniques, including DMLF/EBM. In particular, the utility, design, durability, manufacturing cost, and life span of the spring assembly may be improved by manufacturing each portion of the spring assembly using designs that minimize the structural stresses that will be encountered during operation of the integrator valve, for example. The described embodiments utilize DMLS/EBM or another suitable AM technique to build a spring assembly as an integral unit and provide compression, torsion, and bending capability with minimal machining outside of the DMLS/EBM build process. The described embodiments allow for the production of spring assemblies with unique shapes and geometries, without tooling, and using dissimilar materials to allow for increased application flexibility, temperature capability, and fatigue life. This AM process is unique in that it utilizes the powder bed as the feed material for the component build.

Figure 8:
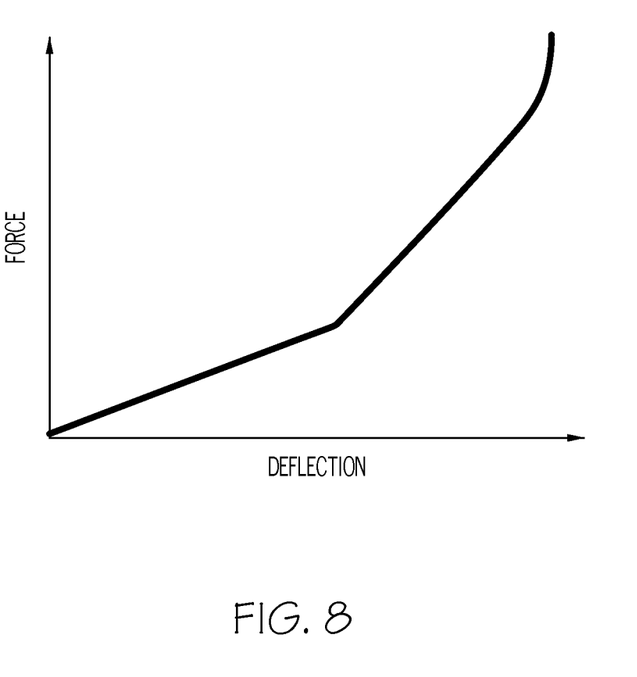
FIG. 8 is a plot of the force versus deflection of an exemplary spring assembly produced in accordance with the method depicted in FIGS. 6 and 7.

The described embodiments further allow for spring assemblies to be produced with end attachments/portions/sections avoiding post build processes such as welding or brazing. These spring ends can be any geometry to allow for maximum load bearing surfaces. Still further, the described embodiments allow for optimal, multiple wire cross sections with controlled metallurgy to produce unique combinations of multi-material and multi-cross section designs for optimum compression, torsion, or deflection capabilities. For example, as shown in the exemplary force/deflection plot of FIG. 8, a spring assembly can be produced that requires increasing amounts of force to be applied for increasing deflection, resulting in a linear, bi-linear, tri-linear, or non-linear force-deflection characteristic.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. Various changes may be made in the function and arrangement of elements described in an exemplary embodiment without departing from the scope of the invention as set forth in the appended claims.

What is claimed is:

1. A method for manufacturing a bypass valve of a turbine engine control system, the bypass valve comprising a proportional valve and an integrator valve, the integrator valve comprising an integrator spring assembly, the method comprising the steps of:

forming the integrator spring assembly using an additive manufacturing technique, wherein the integrator spring assembly comprises first and second end portions with a spring portion disposed between the first and second end portions, and wherein the first and second end portions and the spring portion are formed as an integral unit without welding or brazing using the additive manufacturing technique, wherein the step of forming the integrator spring assembly is further defined as forming a structure that comprises:

the spring portion disposed between the first end portion and the second end portion such that the first end portion is physically connected to a first end of the spring portion and the second end portion is physically connected to a second end of the spring portion, wherein the spring portion comprises a helical coil having at least one spring pitch, wherein the spring portion comprises both of a variable pitch and a variable cross-sectional area, wherein the helical coil rotates about a central axis of the spring portion, and wherein the helical coil terminates at the first end portion and the second end portion;

wherein the first end portion and the second end portion each comprise a spring-facing surface that extends substantially perpendicular to the central axis of the spring portion, wherein the first end of the spring portion is connected to the first end portion at the spring-facing surface of the first end portion and wherein the second end of the spring portion is connected to the second end portion at the spring-facing surface of the second end portion, wherein the first and second ends of the spring portion have zero pitch such that they are oriented parallel to the respective spring facing surfaces of the first and second ends portions, wherein the first end portion and the second end portion are physically connected to the spring portion without any weld or braze joints between the first or second end portions and the spring portion such that the integrator spring assembly is manufactured as an integral unit without any welding or brazing of the first end portion, the second end portion, or the spring portion using the additive manufacturing technique, and the variable cross-sectional area being defined as a cross-section taken through the helical coil in a plane that also includes the central axis being different in shape at at least two different points along the helical coil, the at least two points being between the first and second ends of the spring portion, wherein the cross-section at each of the at least two different points is independently selected from the following group of two-dimensional shapes consisting of: 1) a first shape defined as having an enclosed perimeter with two sets of parallel, planar opposing sides, connected by curved edges, 2) a second shape defined as having an enclosed perimeter with one set of parallel, planar opposing sides, connected by curved edges, and 3) a third shape defined as having one set of planar opposing sides, wherein one of the planar sides is inclined at an angle and the other one of the planar sides is declined at the angle, the one set of planar opposing sides being connected by both a planar end and a curved end; and assembling the integrator spring assembly, the integrator valve, and the proportional valve into a complete bypass valve assembly.

2. The method of claim 1, wherein the additive manufacturing technique comprises direct metal laser sintering.

3. The method of claim 1, wherein the additive manufacturing technique comprises electron beam melting.

4. The method of claim 1, wherein the spring portion of the integrator spring assembly is formed so as to comprise a variable pitch, the variable pitch being defined as forming the helical coil having at least two different spring pitches.

5. The method of claim 1, wherein the spring portion of the integrator spring assembly is formed so as to comprise a plurality of materials such that a first part of the spring portion is formed using a first material and a second part of the spring portion is formed using a second material that is different than the first material.

6. The method of claim 1, wherein the spring portion of the integrator spring assembly is formed so as to comprise a first material and wherein at least one of the end portions of the integrator spring assembly is formed so as to comprise a second material that is different that the first material.

7. A spring assembly, comprising:
a first end portion;
a second end portion; and
a spring portion disposed between the first end portion and the second end portion such that the first end portion is physically connected to a first end of the spring portion and the second end portion is physically connected to a second end of the spring portion,
wherein the spring portion comprises a helical coil having at least one spring pitch, wherein the spring portion comprises both of a variable pitch and a variable cross-sectional area, wherein the helical coil rotates about a central axis of the spring portion, and wherein the helical coil terminates at the first end portion and the second end portion;
wherein the first end portion and the second end portion each comprise a spring-facing surface that extends substantially perpendicular to the central axis of the spring portion, wherein the first end of the spring portion is connected to the first end portion at the spring-facing surface of the first end portion and wherein the second end of the spring portion is connected to the second end portion at the spring-facing surface of the second end portion, wherein the first and second ends of the spring portion have zero pitch such that they are oriented parallel to the respective spring facing surfaces of the first and second ends portions,
wherein the first end portion and the second end portion are physically connected to the spring portion without any weld or braze joints between the first or second end portions and the spring portion such that the spring assembly is manufactured as an integral unit without any welding or brazing of the first end portion, the second end portion, or the spring portion, and
the variable cross-sectional area being defined as a cross-section taken through the helical coil in a plane that also includes the central axis being different in shape at at least two different points along the helical coil, the at least two points being between the first and second ends of the spring portion, wherein the cross-section at each of the at least two different points is independently selected from the following group of two-dimensional shapes consisting of: 1) a first shape defined as having an enclosed perimeter with two sets of parallel, planar opposing sides, connected by curved edges, 2) a second shape defined as having an enclosed perimeter with one set of parallel, planar opposing sides, connected by curved edges, and 3) a third shape defined as having one set of planar opposing sides, wherein one of the planar sides is inclined at an angle and the other one of the planar sides is declined at the angle, the one set of planar opposing sides being connected by both a planar end and a curved end.

8. The spring assembly of claim 7, wherein the spring assembly is manufactured as an integral unit using additive manufacturing techniques.

9. The spring assembly of claim 7, wherein the spring portion comprises a variable pitch, the variable pitch being defined as the helical coil having at least two different spring pitches.

10. The spring assembly of claim 7, wherein the spring portion comprises a plurality of materials such that a first part of the spring portion comprises a first material and a second part of the spring portion comprises a second material that is different than the first material.

11. The spring assembly of claim 7, wherein the spring portion comprises a first material and at least one of the first and second end portions comprise a second material that is different from the first material.

12. The spring assembly of claim 7, wherein the spring assembly comprises a portion of an integrator valve assembly.

13. A bypass valve assembly for use in an engine control system of a gas turbine engine, the bypass valve assembly comprising:
a proportional valve assembly comprising a proportional spring; and
an integrator valve assembly comprising an integrator spring assembly, wherein the integrator spring assembly comprises:
a first end portion;
a second end portion; and
a spring portion disposed between the first end portion and the second end portion such that the first end portion is physically connected to a first end of the spring portion and the second end portion is physically connected to a second end of the spring portion,
wherein the spring portion comprises a helical coil having at least one spring pitch, wherein the spring portion comprises both of a variable pitch and a variable cross-sectional area, wherein the helical coil rotates about a central axis of the spring portion, and wherein the helical coil terminates at the first end portion and the second end portion;
wherein the first end portion and the second end portion each comprise a spring-facing surface that extends substantially perpendicular to the central axis of the spring portion, wherein the first end of the spring portion is connected to the first end portion at the spring-facing surface of the first end portion and wherein the second end of the spring portion is connected to the second end portion at the spring-facing surface of the second end portion, wherein the first and second ends of the spring portion have zero pitch such that they are oriented parallel to the respective spring facing surfaces of the first and second ends portions, wherein the first end portion and the second end portion are physically connected to the spring portion without any weld or braze joints between the first or second end portions and the spring portion such that the integrator spring assembly is manufactured as an integral unit without any welding or brazing of the first end portion, the second end portion, or the spring portion, and the variable cross-sectional area being defined as a cross-section taken through the helical coil in a plane that also includes the central axis being different in shape at at least two different points along the helical coil, the at least two points being between the first and second ends of the spring portion, wherein the cross-section at each of the at least two different points is independently selected from the following group of two-dimensional shapes consisting of: 1) a first shape defined as having an enclosed perimeter with two sets of parallel, planar opposing sides, connected by curved edges, 2) a second shape defined as having an enclosed perimeter with one set of parallel, planar opposing sides, connected by curved edges, and 3) a third shape defined as having one set of planar opposing sides, wherein one of the planar sides is inclined at an angle and the other one of the planar sides is declined at the angle, the one set of planar opposing sides being connected by both a planar end and a curved end.

14. The bypass valve assembly of claim 13, wherein the integrator spring assembly is manufactured as an integral unit using additive manufacturing techniques.

15. The bypass valve assembly of claim 13, wherein the spring portion comprises a variable pitch, the variable pitch being defined as the helical coil having at least two different spring pitches.

16. The bypass valve assembly of claim 13, wherein the spring portion comprises a plurality of materials such that a first part of the spring portion comprises a first material and a second part of the spring portion comprises a second material that is different than the first material.

17. The bypass valve assembly of claim 13, wherein the spring portion comprises a first material and at least one of the first and second end portions comprise a second material that is different from the first material.

* * * * *